(12) United States Patent
Choi et al.

(10) Patent No.: US 9,294,661 B2
(45) Date of Patent: Mar. 22, 2016

(54) CAMERA MODULE

(71) Applicant: LG INNOTEK CO., LTD., Seoul (KR)

(72) Inventors: Yong Nam Choi, Seoul (KR); Jung Hwan Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 14/359,225

(22) PCT Filed: Nov. 14, 2012

(86) PCT No.: PCT/KR2012/009581
§ 371 (c)(1),
(2) Date: May 19, 2014

(87) PCT Pub. No.: WO2013/073822
PCT Pub. Date: May 23, 2013

(65) Prior Publication Data
US 2014/0267767 A1    Sep. 18, 2014

(30) Foreign Application Priority Data

Nov. 18, 2011  (KR) .................. 10-2011-0120708
Nov. 23, 2011  (KR) .................. 10-2011-0122843

(51) Int. Cl.
*H04N 5/225* (2006.01)
*G03B 3/10* (2006.01)
*G03B 17/02* (2006.01)
*G02B 7/02* (2006.01)

(52) U.S. Cl.
CPC .............. *H04N 5/2257* (2013.01); *G02B 7/023* (2013.01); *G03B 3/10* (2013.01); *G03B 17/02* (2013.01); *H04N 5/2252* (2013.01); *H04N 5/2253* (2013.01); *G02B 7/02* (2013.01)

(58) Field of Classification Search
CPC .............. H04N 5/2251–5/22547; G02B 7/02; G02B 7/023; G02B 13/001
See application file for complete search history.

(56) References Cited

U.S. PATENT DOCUMENTS

| | | | |
|---|---|---|---|
| 2007/0263115 A1* | 11/2007 | Horidan et al. | 348/340 |
| 2008/0192124 A1* | 8/2008 | Nagasaki | 348/208.11 |
| 2008/0198254 A1* | 8/2008 | Nagasaki | 348/335 |
| 2009/0316040 A1* | 12/2009 | Takatsuka et al. | 348/376 |

(Continued)

FOREIGN PATENT DOCUMENTS

EP    1471730 A1    10/2004

OTHER PUBLICATIONS

International Search Report in International Application No. PCT/KR2012/009581, filed Nov. 14, 2012.

*Primary Examiner* — Daniel M Pasiewicz
(74) *Attorney, Agent, or Firm* — Saliwanchik, Lloyd & Eisenschenk

(57) ABSTRACT

The present invention relates to a camera module, the camera module including a PCB (Printed Circuit Board) mounted with an image sensor, a base formed with an IRCF (Infrared Cut Filter) at a position corresponding to that of the image sensor, a bobbin including a coil winding unit vertically reciprocatively formed at an upper surface of the base and provided at a periphery, and a plurality of rib members protrusively formed from a floor surface, a yoke formed with a magnet arranged at a position corresponding to that of a coil of the bobbin, and a shock absorption member arranged at an ambience of the rib members and longer than the rib member, wherein the shock absorption member is compressed by being elastically deformed, in a case the base is brought into contact with the rib member.

18 Claims, 3 Drawing Sheets

(56) References Cited

U.S. PATENT DOCUMENTS

| | | |
|---|---|---|
| 2010/0110270 A1* | 5/2010 | Sekimoto et al. ............ 348/340 |
| 2010/0182490 A1* | 7/2010 | Seol et al. .................... 348/345 |
| 2010/0214426 A1 | 8/2010 | Kimura |
| 2011/0026915 A1* | 2/2011 | Baik et al. .................... 396/529 |
| 2011/0085072 A1 | 4/2011 | Jung |
| 2011/0121666 A1* | 5/2011 | Park et al. ....................... 310/15 |
| 2011/0159919 A1* | 6/2011 | Kim .......................... 455/556.1 |
| 2011/0217034 A1* | 9/2011 | You et al. ..................... 396/529 |
| 2011/0236008 A1* | 9/2011 | Kang et al. ................... 396/133 |
| 2011/0262121 A1* | 10/2011 | Yanagisawa et al. .......... 396/55 |
| 2013/0142502 A1* | 6/2013 | Kang et al. ..................... 396/55 |

\* cited by examiner

CAMERA MODULE

CROSS-REFERENCE TO RELATED APPLICATIONS

This application is the U.S. national stage application of International Patent Application No. PCT/KR2012/009581, filed Nov. 14, 2012, which claims priority to Korean Application Nos. 10-2011-0120708, filed Nov. 18, 2011, and 10-2011-0122843, filed Nov. 23, 2011, the disclosures of each of which are incorporated herein by reference in their entirety.

TECHNICAL FIELD

The teachings in accordance with exemplary embodiments of this invention relate generally to a camera module.

BACKGROUND ART

Generally, an auto focusing adjustment of a camera module is realized by lens control using a VCM (Voice Coil Motor). A camera module formed with a VCM performs a reciprocating operation of a bobbin relative to an image sensor in response to an interaction between a coil wound on a periphery of the bobbin and a yoke to control a focus of an image incident on the camera module.

However, the configuration thus described suffers from a disadvantage in that the bobbin and a base repetitively collide due to a focus adjustment operation including the reciprocating movement of the bobbin.

Generally, the bobbin is brought into surface-contact with the base at a position adjacent to an IR (Infrared) filter installed at a position corresponding to the image sensor of the base. The repetitive collision between the bobbin and the base creates foreign objects caused by scattering of fine particles.

The foreign objects generated by collision between the bobbin and the base may pollute the IR filter positioned nearby, and if the filter is polluted by the foreign objects, a thin image or a black spot is generated on an image to thereby result in defects of the camera module.

DISCLOSURE OF INVENTION

Technical Problem

The present general inventive concept provides a camera module directed to solve the aforementioned problems or disadvantages by preventing a filter from being polluted by foreign objects generated by collision between a bobbin and a base caused by reciprocating movement of the bobbin, and to prevent the camera module from being generated with a characteristic distortion by collision shock.

Solution to Problem

According to a general aspect and an exemplary embodiment of the present invention, there is provided a camera module, the camera module comprising: a PCB (Printed Circuit Board) mounted with an image sensor; a base mounted on an upper surface of the PCB and formed with an IRCF (Infrared Cut Filter) at a position corresponding to that of the image sensor; a bobbin vertically reciprocatively formed at an upper surface of the base, with any one of an upper surface of the base, an inner surface of an upper frame, and a space unit between the base and the upper frame as a reference position, and including a plurality of rib members protrusively formed on a floor surface; a yoke formed with a magnet arranged at a position corresponding to that of a coil of the bobbin; and a shock absorption member arranged at an ambience of the rib members and formed longer than the rib members.

Preferably, but not necessarily, the shock absorption member is compressed by being elastically deformed, in a case the base is brought into contact with the rib members.

Preferably, but not necessarily, the shock absorption member is fixed to any one of the base and the bobbin.

Preferably, but not necessarily, the shock absorption member is elastically deformed or restored to a direction parallel with a lifting direction of the bobbin.

Preferably, but not necessarily, the shock absorption member is provided with any one of foam, rubber and urethane member, and absorbs shocks through elastic deformation in case of being brought into contact with the base.

Preferably, but not necessarily, the shock absorption member is interposed between the bobbin and the base.

Preferably, but not necessarily, the shock absorption member is arranged in a plural number.

Preferably, but not necessarily, each of the plurality of shock absorption members is provided in an arc shape, each member having a predetermined height.

Preferably, but not necessarily, the shock absorption member is formed on a floor surface of the bobbin.

Preferably, but not necessarily, the shock absorption member is formed on a surface facing the bobbin of the base.

Preferably, but not necessarily, the shock absorption member is formed on a floor surface of the rib member.

Preferably, but not necessarily, the shock absorption member is formed at a position not interfered with a bottom elastic member.

Preferably, but not necessarily, the rib member is provided in a shape tapering off toward a distal end surface contacting the base.

Preferably, but not necessarily, the yoke is provided in a shield can of metal material having a function of shielding electromagnetic wave to form an extreme outline of the camera module.

Preferably, but not necessarily, the yoke is formed with a resin material, and the yoke is further formed at an outer side thereof with a housing member provided in a shield can of metal material having a function of shielding the electromagnetic wave.

Preferably, but not necessarily, an extreme outline of the yoke forms the extreme outline of the camera module, and a remaining portion of the yoke is integrally formed with the housing member to be a same surface as an outer surface of the yoke.

In another general aspect and an exemplary embodiment of the present invention, there is provided a camera module, the camera module comprising: a PCB (Printed Circuit Board) mounted with an image sensor; a base mounted on an upper surface of the PCB and formed with an IRCF (Infrared Cut Filter) at a position corresponding to that of the image sensor; an actuator formed at an upper surface of the base with one or more rib members protrusively formed from a floor surface of a bobbin; and a shock absorption member arranged at an ambience of the rib members and formed longer than the rib members.

In still another general aspect and an exemplary embodiment of the present invention, there is provided a camera module, the camera module comprising: a PCB (Printed Circuit Board) mounted with an image sensor; a base mounted on an upper surface of the PCB and formed with an IRCF (Infrared Cut Filter) at a position corresponding to that of the image sensor; a bobbin vertically reciprocatively formed at an upper surface of the base, with any one of an upper surface of the base, an inner surface of an upper frame, and a space unit between the base and the upper frame as a reference position, and including a coil winding unit provided at a periphery; a yoke formed with a magnet arranged at a position corresponding to that of a coil of the bobbin; an upper frame positioned at an upper surface of the bobbin; and a shock absorption member interposed between the upper frame and the bobbin, wherein the shock absorption member is compressed by being elastically deformed, in a case the upper frame is brought into contact with the bobbin.

Preferably, but not necessarily, the shock absorption member is arranged at a position not interfered with an upper elastic member elastically supporting the bobbin, and one or more shock absorption members are arranged at any one position of the upper frame and the bobbin.

Preferably, but not necessarily, the shock absorption member is attached to and fixed at the upper frame using double-sided tape, and surface-contacts an entire upper surface of the bobbin, and the bobbin is further formed, at a position not interfered with the shock absorption member, with an accommodation groove.

Advantageous Effects of Invention

A camera module according to the present invention has an advantageous effect in that an ambience of a rib is formed with a shock absorption member that is brought into contact with a base in advance, whereby the rib is minimized in being damaged by repetitive collision between the rib formed on a floor surface of a bobbin and the base caused by reciprocating movement of the bobbin.

Another advantageous effect is that amount of particles possibly generated by repetitive collision between a rib and a base can be minimized to minimize generation of defective camera module by a filter being polluted by generated foreign objects.

BEST MODE FOR CARRYING OUT THE INVENTION

Now, the camera module according to exemplary embodiments of the present invention will be described in detail with reference to the accompanying drawings.

Figure 1:
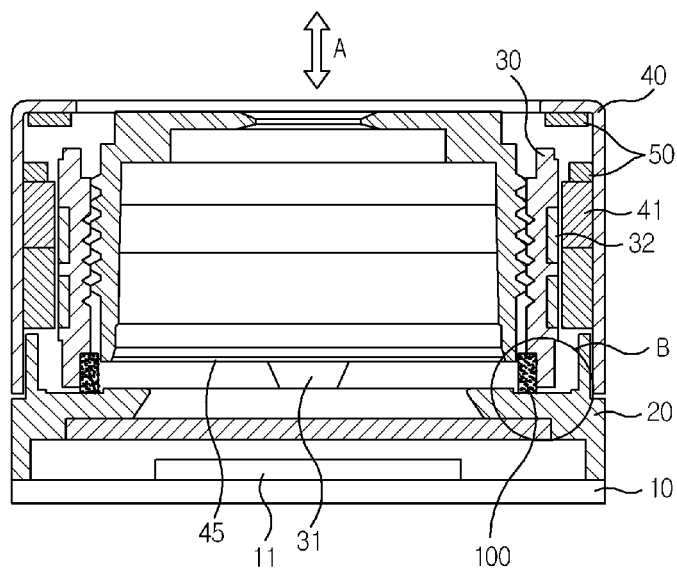
FIG. 1 is a schematic cross-sectional view of a camera module according to a first exemplary embodiment of the present invention.
Figure 2:
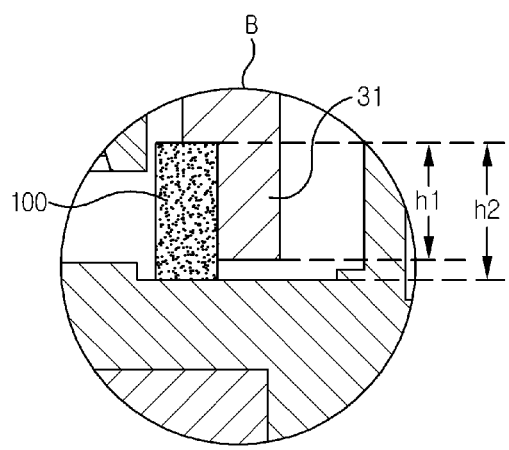
FIG. 2 is an enlarged view of 'B' part of FIG. 1.
Figure 3:
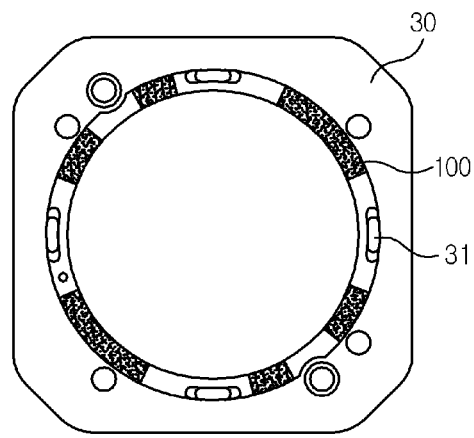
FIG. 3 is a schematic view of a floor surface of a bobbin of FIG. 1.
Figure 4:
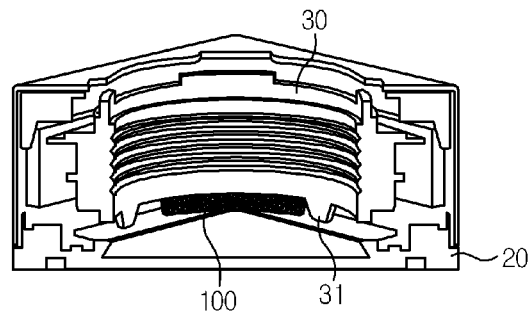
FIG. 4 is a cut-out perspective view of FIG. 1.

FIG. 1 is a schematic cross-sectional view of a camera module according to a first exemplary embodiment of the present invention, FIG. 2 is an enlarged view of 'B' part of FIG. 1, FIG. 3 is a schematic view of a floor surface of a bobbin of FIG. 1, and FIG. 4 is a cut-out perspective view of FIG. 1.

Referring to FIGS. 1 and 2, a camera module according to the present invention includes a PCB (Printed Circuit Board, 10), a base (20), a bobbin (30), a yoke (40) and a magnet (41).

The PCB (10) is mounted at an upper surface with an image sensor (11), and the PCB (10) is mounted at an upper surface with a base (20). An IRCF (Infrared Cut Filter) is formed at a position opposite to the image sensor (11) of the base (10) to thereby prevent light of an infrared wavelength from being transmitted to the image sensor (11).

The bobbin (30) is liftably mounted at an upper surface of the base (20). An initial position of the bobbin (30) may be formed at any one of an inner surface of an upper frame (50, described later) and a space unit between the base (20) and the upper frame. The bobbin (30) is protrusively formed at a floor surface thereof with at least one of more rib members (31), where the rib member (31) is brought into contact with the base (20) at an initial position. In the exemplary embodiment of the present invention, it is preferably that each of a plurality of rib members (31) be symmetrically and protrusively formed on the floor surface of the bobbin (30).

The bobbin (30) is formed at a periphery thereof with a coil (32) being wound thereon, and in a case a current flows, a magnetic field is formed on the bobbin (30) to allow the bobbin (30) to perform a reciprocal movement to an arrow 'A' direction of FIG. 1 by electrical interaction with a magnet (41) mounted on the yoke (40).

Referring to FIG. 4, an area of the rib member (31) may be provided in a shape tapering off toward a distal end surface contacting the base (30) to thereby minimize an area contacted by the rib member (31) and the base (20) during reciprocal movement of the bobbin (30).

Referring to FIG. 1 again, the yoke (40) is arranged at an upper surface of the base (20), and is formed at an inner surface with a magnet (41) to be opposite to the bobbin (30) wound with the coil (32). The yoke (40) may form an extreme outer surface of the camera module. However, the present invention is not limited thereto, and the yoke (40) may be further formed with a separate housing member to cover the extreme outer surface of the yoke (40).

A distal end of a bottom elastic member (45) is fixedly arranged between the yoke (40) and the base (20). A through hole is provided at a position corresponding to the rib member (31) to allow the rib member (31) to surface-contact with the base (20) without any interference, whereby the rib member (31) can pass the bottom elastic member (45).

In an exemplary embodiment of the present invention, the bottom elastic member (45) is configured to support a floor surface of the bobbin (30), and to elastically support a vertical movement of the bobbin (30). One distal end of the bottom elastic member (45) may be conductively connected to the PCB (10), and the other distal end may be connected by a start line and an end line of the coil (32) wound on a periphery of the bobbin (30). Thus, the coil (32) is electrically connected to the PCB (10) through the bottom elastic member (45).

In another exemplary embodiment of the present invention, the bottom elastic member (45) may be electrically connected to the PCB (10) through a separate terminal (not shown), and the bottom elastic member (45) may be integrally formed with a terminal and directly connected to the PCB (10).

Meanwhile, although not illustrated, a spacer may be interposed between the yoke (40) and the bottom elastic member (45). The spacer is mounted to insulate the bottom elastic member (45) from the yoke (40), and the base (30) may be also changed in shape and used instead of the spacer.

Furthermore, the bobbin (30) is provided at an upper surface with an upper elastic member (not shown) to elastically support the upper surface of the bobbin (30). To this end, the yoke (40) is arranged at an inner surface with an upper frame (50), as shown in FIG. 1, to fix the upper elastic member (not shown), where the upper elastic member (not shown) can elastically support the bobbin (30) vertically reciprocating along with the bottom elastic member (45).

Meanwhile, the upper frame (50) may be omitted, as the case may be, or only a lateral wall arranged at an upper surface of the magnet (41) may be provided, where in a case only the lateral wall is provided, the upper frame (50) formed only with the lateral wall is formed with an upwardly protruded boss (not shown), and the upper elastic member may be also fixed using the boss.

Meanwhile, although not illustrated, in another exemplary embodiment of the present invention, it may be possible to further include a housing member to wrap the yoke (40) forming an exterior look of the camera module. In this case, the housing member is configured in such a manner that an outside image can be transmitted to the image sensor through a lens arranged inside at an inner surface of the bobbin (30), and a lens hole having a size corresponding to the lens may be centrally formed to allow the outside image to be transmitted to the image sensor (11) through the through hole.

Furthermore, the housing member may be provided with a metal material to block an electromagnetic wave. However, the present invention is not limited thereto, and it is possible to form an extreme outside of the camera module with resin material or with a metal material, as occasion demands.

It is still possible to dispense with a separate housing member and to integrally form the housing member with the yoke. That is, in order to reduce the size of the camera module, the housing member is dispensed with, and an outer surface of the yoke is exposed, and a remaining portion of the yoke is integrally formed with the housing member to be a same surface as an outer surface of the yoke.

A plurality of shock absorption members (100) may be formed at an ambience of the rib member (31) with each length being longer than the rib member (31). That is, as shown in FIGS. 1 and 2 again, a length (h1) of the rib member (31) may be shorter than a length (h2) of the shock absorption members (100). Thus, in order to allow the rib member (31) and the base (20) to contact, compression is made until the height (h2) of the shock absorption member (100) becomes equal to the height (h1) of the rib member (31), and then the rib member (31) can surface-contact. To this end, the shock absorption member (100) may be provided with foam, rubber and urethane member to elastically deform or restore to a direction parallel with a reciprocal movement direction of arrow 'A' direction of the bobbin (30).

Thus, in a case the shock absorption member (100) is elastically deformed to contact the base (20), a shock generated by collision between the base (20) and rib member (31) can be absorbed by the elastic deformation of the shock absorption member (100).

Meanwhile, the shock absorption member (100) is preferably arranged at a space between the bobbin (30) and the base (20). However, the shock absorption member (100) may be installed on a floor surface of the bobbin (30), or at a surface opposite to the bobbin (30) of the base (20). At this time, the floor surface of the bobbin (30) may be a floor surface of the rib member (31).

Meanwhile, as shown in FIGS. 1 and 4, the bottom elastic member (45) liftably and elastically supports the bobbin (30), and to this end, there is a need of installation that is not interfered with the rib member (31). In this case, in a case the shock absorption member (100) is interfered with the bottom elastic member (45), the shock absorption through elastic deformation is impossible to thereby avoid the interference with the bottom elastic member (45).

To this end, the bottom elastic member (45) may be configured in such a manner that a through hole is formed at an area where the rib member (31) and the shock absorption member (100) are installed, whereby the rib member (31) and the shock absorption member (100) pass the bottom elastic member (45) to surface-contact the base (20).

Furthermore, the bottom elastic member (45) is formed with a through hole only at a surface opposite to the rib member (31) protrusively formed from a floor surface side of the bobbin (30) to avoid interference thereof as in the previous embodiment, where the shock absorption member (100) may be fixed to the floor surface of the bobbin (30) or to the floor surface of the rib member (31), or the shock absorption member (100) may be attached to the base (20), where arrangement is made at a position not interfered with the bottom elastic member (45).

At this time, the shock absorption member (100) is preferably attached to and fixed at the floor surface of the bobbin (30), or the base (20) side. However the present invention is not limited thereto, and the shock absorption member (100) may be fixed by being coated with an adhesive or using a separate fastening element, if necessary.

Furthermore, as shown in FIGS. 3 and 4, each of the plurality of shock absorption members (100) may be provided in an arc shape having a predetermined height. This is because the through hole forming a light path is round and formed at a center of the bobbin (30). That is, in a case the shock absorption member is provided in the arc shape, an interference with ambient other parts can be minimized.

Each of the plurality of shock absorption members (100) may be provided in a ring shape. However, the bottom elastic member (45) is generally configured in 2-divisional structure based on polarity, such that in order to avoid interference with the bottom elastic member (45), the ring-shaped shock absorption member (100) may be configured with an arc shape divided in a plural number, as shown in FIGS. 3 and 4.

As apparent from the present invention based on the foregoing description, wear or damage of the rib member (31) protrusively and integrally formed on a floor surface of the bobbin (30) formed with resin material softer than a metal material can be maximally prevented from a sudden outside shock and repetitive and reciprocative movement, whereby pollution problem caused by fine dust or particles frequently generated by wear and damage of the rib member, and an abnormal operation of camera module caused by wear and damage of the rib member (31) can be solved.

Although not illustrated in the drawings, it is also possible to install a distal end of the rib member (31) with a shock absorption member (100) for absorption of shocks. That is, in order to minimize generation of fine dust or particles caused by damages from repetitive shocks to the rib member (31), attachment of a shock absorption member (100) provided in foam member to surface itself that is to be worn by repetitive shock to the rib member (31) can be restricted.

MODE FOR THE INVENTION

Figure 5:
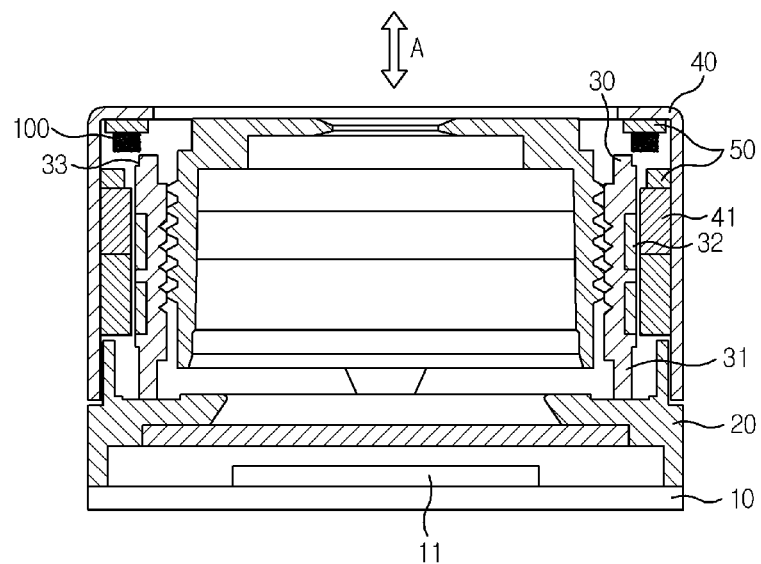
FIG. 5 is a schematic cross-sectional view illustrating a state before activation of a bobbin of a camera module according to a second exemplary embodiment of the present invention.
Figure 6:
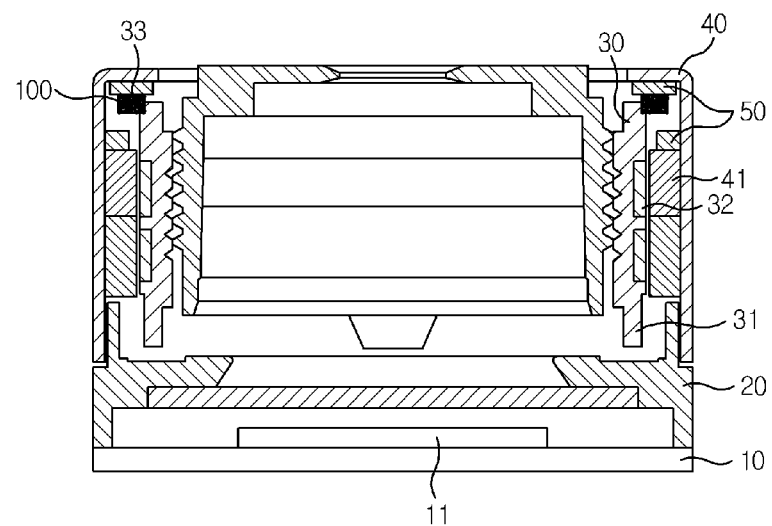
FIG. 6 is schematic cross-sectional view illustrating a state of a bobbin of a camera module having ascended to a highest position after activation according to a third exemplary embodiment of the present invention.
Figure 7:
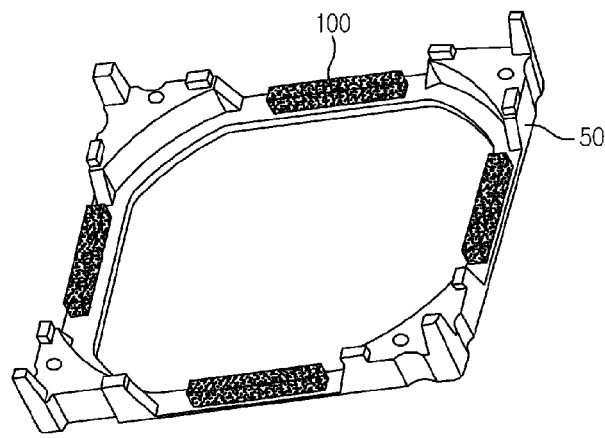
FIG. 7 is a perspective view illustrating a state of a shock absorption member mounted on a upper frame of FIG. 5.
Figure 8:
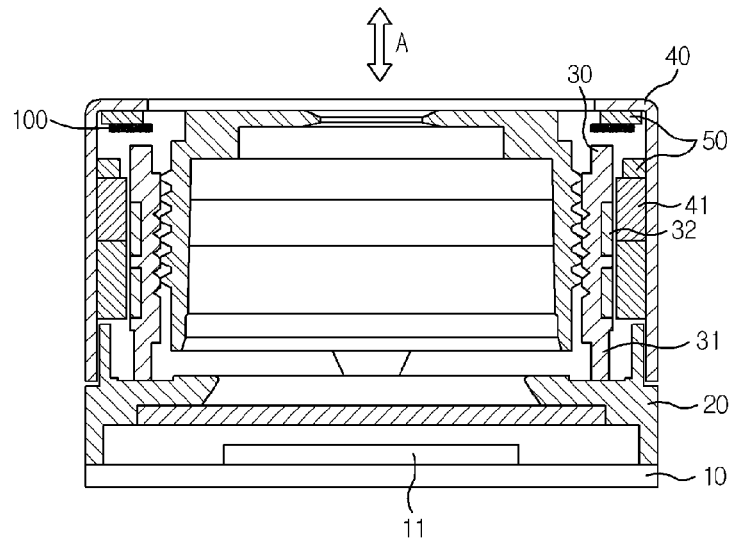
FIG. 8 is a schematic cross-sectional view illustrating a state before activation of a bobbin of a camera module according to a third exemplary embodiment of the present invention.
Figure 9:
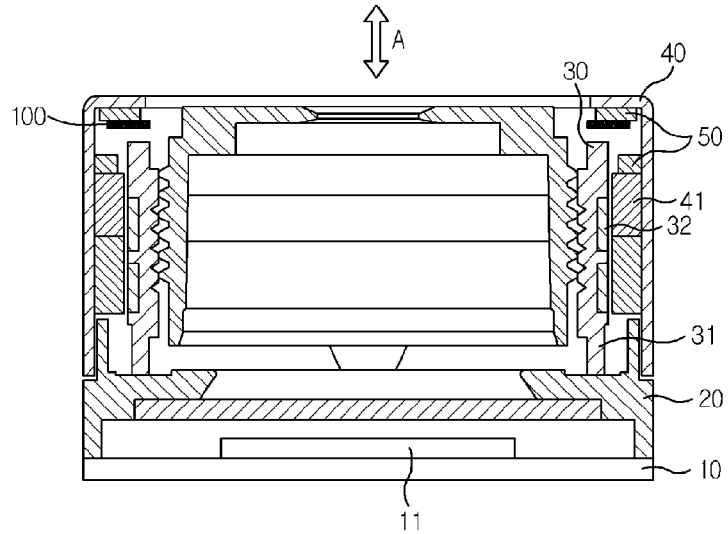
FIG. 9 is a schematic cross-sectional view illustrating a state of a bobbin of a camera module having ascended to a highest position after activation according to a third exemplary embodiment of the present invention.

FIG. 5 is a schematic cross-sectional view illustrating a state before activation of a bobbin of a camera module according to a second exemplary embodiment of the present invention, FIG. 6 is schematic cross-sectional view illustrating a state of a bobbin of a camera module having ascended to a highest position after activation according to a third exemplary embodiment of the present invention, FIG. 7 is a perspective view illustrating a state of a shock absorption member mounted on a upper frame of FIG. 5, FIG. 8 is a schematic cross-sectional view illustrating a state before activation of a bobbin of a camera module according to a third exemplary embodiment of the present invention, and FIG. 9 is a schematic cross-sectional view illustrating a state of a bobbin of a camera module having ascended to a highest position after activation according to a third exemplary embodiment of the present invention.

Referring to FIGS. 5 and 6, a configuration of camera module according to the second exemplary embodiment of the present invention is same as that of first exemplary embodiment of the present invention.

Referring to FIGS. 5 to 7, a plurality of shock absorption members (100) according to the second exemplary embodiment of the present invention is divisively provided on a floor surface of an upper frame (50), where the shock absorption member is first brought into surface-contact with a bobbin (30) before the bobbin (30) collides with the upper frame (50). As illustrated in FIG. 7, the shock absorption member (100) is preferably provided with a soft material in a shape of a bar.

That is, the shock absorption member (100) is provided with any one of foam, rubber and urethane member to absorb shocks caused by contact and/or collision through elastic deformation in a case the upper frame (50) and the bobbin (30) are brought into contact and/or collide. At this time, one shock absorption member (100) may be arranged according to design specification.

Although the shock absorption member (100) is spaced apart from the bobbin (30) at a predetermined distance at an initial position as shown in FIG. 5, the shock absorption member (100) is brought into surface-contact with the bobbin (30) as shown in FIG. 6, to prevent the bobbin (30) from directly collide with the upper frame (50), in a case the bobbin (30) is activated to reach a maximum ascent height, or the bobbin (30) ascends to a level capable of generating interference with the upper frame (50) due to outside shock. At this time, a surface opposite to the shock absorption member (100) of the bobbin (30) may be further formed with an accommodation groove (33) to allow the shock absorption member (100) to surface-contact.

Furthermore, as illustrated in FIGS. 5 to 7, the shock absorption member (100) according to the present invention is preferably directly arranged on the upper frame (50) supporting an upper spring (not shown). That is, the shock absorption member (100) is preferably formed on a floor surface of the upper frame (50) using adhesive means such as a double-sided tape. The present invention is not limited thereto. For example, an adhesive may be coated for fixation, or a separate fastening element may be used for fixation, if necessary. Furthermore, the shock absorption member (100) may be arranged on a surface opposite to the upper frame (50) of the bobbin (30).

In addition, as shown in FIG. 7, a plurality of the shock absorption members (100) may be arranged on a surface facing the bobbin (30) of the upper frame (50), preferably on each surface at a position opposite to the a magnet (41). That is, as illustrated in FIG. 7, other constituent elements are arranged on each corner of the camera module, such that it is difficult to provide a space for installing the shock absorption member (100).

The upper elastic member (not shown) and the shock absorption member (100) are preferably assembled at a position where the upper elastic member (not shown) and the shock absorption member (100) are prevented from being interfered. That is, the upper elastic member, being a member for restoring an upward movement of the bobbin (30), always needs deformation in response to movement of the bobbin (30), such that the upper elastic member is individually installed from the shock absorption member (100), if possible.

Referring to FIGS. 5 and 8, the shock absorption member (100) according to the third exemplary embodiment of the present invention may be configured to surface-contact with an entire upper surface of the bobbin (30). In this case, in view of the fact that a contact surface may be broadened in comparison with that of the second exemplary embodiment of the present invention, there is no fear of the shock absorption member (100) being partially worn or damaged to effectively absorb shocks from collision.

Although not shown in the drawings, the shock absorption member (100) may be formed at an upper surface of the bobbin (30) or at an accommodation groove (33), and may be provided in a shape of a bar, in addition to a shape of a ring.

As apparent from the present invention based on the foregoing description, the scattering phenomenon of fine dust or particles may be minimized that is generated in the process of a surface opposite to an upper distal end of the bobbin (30) or the upper frame (50) being worn by repetitive and reciprocative movement of the bobbin (30) and sudden outside shock.

Thus, the problems of abnormal operation at the camera module can be solved that is caused by pollution of the camera module from fine dust or particles frequently generated by wear and damage to the bobbin (30) and/or the upper frame (50), and cracks of inner elements such as the upper frame.

Meanwhile, although the first, second and third exemplary embodiments of the present invention have illustrated and explained that an initial position of the bobbin (30) is basically formed on an upper surface of the base (20), the present invention is not limited thereto. For example, the initial position of the bobbin (30) may be formed on an inner surface of the upper frame (50), or a space formed between the base (20) and the upper frame (50), in addition to the upper surface of the base (20).

In a case the initial position of the bobbin (30) is formed on an inner surface of the upper frame (50), or on an upper surface of the base (20), an advantage is that it is easy to set a reference position, and in a case the initial position of the bobbin (30) is formed on a space formed between the base (20) and the upper frame (50), an advantage is that it is possible to set an initial position regardless of an installation position of the shock absorption member (100).

In a case a state of the bobbin (30) being floated in the air is set as an initial position of the bobbin (30), the floated position of the bobbin (30) may be formed as the reference position by applying a first current to a coil wound on the bobbin (30). In a case the bobbin (30) being floated in the air is set as the reference position of the bobbin (30), the bobbin (30) is moved by applying a second current to the coil wound on a periphery of the bobbin (30) to calculate a data for maintaining an optimal focus between a lens mounted on the bobbin (30) based on an object and an image sensor, and by applying a second current corresponding to the data to the coil to move the bobbin (30) to the reference position based on the data.

According to the configuration thus described, generation of an error in initial position caused by elastic deformation of the shock absorption member (100) can be prevented, because the initial position is formed in the air where the bobbin (30) is not contacted by any constituent elements. Furthermore, even if the position of the bobbin (30) is changed to a position where the shock is generated during ascent or descent of the bobbin (30) due to the shock absorption member (100) configured as in the first, second and third exemplary embodiments of the present invention, or even if an outside shock is applied, the camera module can be prevented from pollutant materials such as fine dust and particles generated thereinside due to damage to the bobbin (30) by the shock generated therefrom.

The previous description of the present invention is provided to enable any person skilled in the art to make or use the invention. Various modifications to the invention will be readily apparent to those skilled in the art, and the generic principles defined herein may be applied to other variations without departing from the spirit or scope of the invention. Thus, the invention is not intended to limit the examples described herein, but is to be accorded the widest scope consistent with the principles and novel features disclosed herein.

INDUSTRIAL APPLICABILITY

The camera module according to the present invention has an industrial applicability in that it can be applied to a small-sized camera module mounted on a small electronic device such as a portable terminal, and a tablet PC.

The invention claimed is:
1. A camera module, the camera module comprising:
a Printed Circuit Board (PCB) mounted with an image sensor;
a base disposed on an upper side of the PCB;
a bobbin movably disposed on an upper side of the base;
a first driving unit fixed at the bobbin;
a second driving unit facing the first driving unit and configured to move the first driving unit in response to electromagnetic interaction;
a bottom elastic member elastically supporting the bobbin; and
a shock absorption member disposed between the bobbin and the base;
wherein the shock absorption member includes a plurality of shock absorption units, the shock absorption units being spaced apart from each other; and
wherein at least a portion of the bottom elastic member overlaps a space between the neighboring shock absorption units in a vertical direction along or parallel to an optical axis of a lens.
2. The camera module of claim 1, wherein the shock absorption member is compressed by being elastically deformed, in case the base is brought into contact with a plurality of rib members of the bobbin.
3. The camera module of claim 1, wherein the shock absorption member is fixed to any one of the base and the bobbin.
4. The camera module of claim 1, wherein the shock absorption member is elastically deformed or restored to a direction parallel with a lifting direction of the bobbin.
5. The camera module of claim 1, wherein the shock absorption member is provided with any one of foam, rubber and urethane member, and absorbs shocks through elastic deformation in case of being brought into contact with the base.
6. The camera module of claim 1, wherein each of the plurality of shock absorption units is provided in an arc shape and has a predetermined height.
7. The camera module of claim 1, wherein the shock absorption member is formed on a floor surface of the bobbin.
8. The camera module of claim 1, wherein the shock absorption member is formed on a surface facing the bobbin of the base.
9. The camera module of claim 1, wherein the shock absorption member is formed on a floor surface of a rib member of the bobbin.
10. The camera module of claim 1, wherein the shock absorption member is formed at a position not interfered with the bottom elastic member.
11. The camera module of claim 1, wherein the bobbin comprises a rib member provided in a shape with a distal end surface tapering off toward the base.
12. The camera module of claim 1, further comprising a yoke and wherein the yoke is provided in a shield can of metal material to shield electromagnetic wave and to form an extreme outline of the camera module.
13. The camera module of claim 1, further comprising a yoke and wherein the yoke is formed with a resin material, and the yoke is formed at an outer side thereof with a housing member provided in a shield can of metal material to shield electromagnetic wave.
14. The camera module of claim 1, further comprising a yoke and wherein an extreme outline of the yoke forms an extreme outline of the camera module, and a remaining portion of the yoke is integrally formed with the housing member to be on a same surface as that of an outer surface of the yoke.
15. A camera module, the camera module comprising:
a Printed Circuit Board (PCB) mounted with an image sensor;
a base mounted on an upper surface of the PCB and formed with an Infrared Cut Filter (IRCF) at a position corresponding to that of the image sensor;
an actuator formed on an upper surface of the base with one or more rib members protrusively formed from a floor surface of a bobbin;
a bottom elastic member supporting the bobbin; and
a shock absorption member arranged in a vicinity of the rib members and formed to be longer than the rib members;
wherein the shock absorption member includes a plurality of shock absorption units, the shock absorption units being spaced apart from each other; and
wherein at least a portion of the bottom elastic member overlaps a space between the neighboring shock absorption units in a vertical direction along or parallel to an optical axis of a lens.
16. A camera module, the camera module comprising:
a Printed Circuit Board (PCB) mounted with an image sensor;
a base disposed on an upper side of the PCB;
a bobbin movably disposed on an upper side of the base;
a first driving unit fixed at the bobbin;
a second driving unit facing the first driving unit and configured to move the first driving unit in response to electromagnetic interaction;
an upper elastic member elastically supporting the bobbin;
an upper frame disposed on an upper side of the bobbin; and a shock absorption member interposed between the upper frame and the bobbin;

wherein the shock absorption member includes a plurality of shock absorption units, the shock absorption units being spaced apart from each other; and wherein at least a portion of the upper elastic member overlaps a space between the neighboring shock absorption units in a vertical direction along or parallel to an optical axis of a lens.

17. The camera module of claim 16, wherein the shock absorption member is arranged at a position not interfered with an upper elastic member elastically supporting the bobbin.

18. The camera module of claim 16, wherein the shock absorption member is attached to and fixed at the upper frame with double-sided tape, and surface-contacts an entire upper surface of the bobbin, and the bobbin is formed at a position not interfered with the shock absorption member with an accommodation groove.

* * * * *